(12) United States Patent
Huynh et al.

(10) Patent No.: US 7,582,273 B1
(45) Date of Patent: Sep. 1, 2009

(54) PREPARATION OF CARBON NANOPARTICLES AND CARBON NITRIDE FROM HIGH NITROGEN COMPOUND

(75) Inventors: My Hang V. Huynh, Los Alamos, NM (US); Michael A. Hiskey, Los Alamos, NM (US)

(73) Assignee: Los Almos National Security, LLC, Los Alamos, NM (US)

( * ) Notice: Subject to any disclaimer, the term of this patent is extended or adjusted under 35 U.S.C. 154(b) by 91 days.

(21) Appl. No.: 11/257,546

(22) Filed: Oct. 24, 2005

Related U.S. Application Data (60) Provisional application No. 60/622,260, filed on Oct. 25, 2004.

(51) Int. Cl.
C01B 21/06 (2006.01)
C01C 3/00 (2006.01)
C09B 29/52 (2006.01)
C07D 403/00 (2006.01)

(52) U.S. Cl. .................. 423/364; 423/384; 534/767; 544/198

(58) Field of Classification Search .................. None
See application file for complete search history.

(56) References Cited

U.S. PATENT DOCUMENTS 6,261,722 B1 7/2001 Dasgupta et al.
7,119,179 B1 * 10/2006 Huynh et al. ............... 534/767

OTHER PUBLICATIONS

Gillan; Synthesis of Nitrogen-Rich Carbon Nitride Networks from an Energetic Molecular Azide Precursor; Chem. Mater.; 12, 3906-3912; 2000.*
Huynh et al., "3,6-Di(azido)-1,2,4,5-Tetrazine: A Precursor for the Preparation of Carbon Nanospheres and Nitrogen-Rich Carbon Nitrides," Angew. Chem. Int. Ed., Oct. 21, 2005, vol. 43, pp. 5658-5661.
Huynh et al., Synthesis, Characterization, and Energetic Properties of Diazido Heteroaromatic High-Nitrogen C-N Compound, J. Am. Chem. Soc., Aug. 2005, vol. 127, pp. 12537-12543.
Huynh et al., "Polyazido High-Nitrogen Compounds: Hydrazo-and Azo-1,3,5-Triazine," Chem. Int. Ed., Sep. 2004, vol. 43, No. 37, pp. 4924-4928.
Miller et al., "Synthesis and Structure of 2,5,8-Triazido-s-Leptazine: An Energetic and Luminescent Precursor to Nitrogen-Rich Carbon Nitrides," J. Am. Chem. Soc., May 2004, vol. 126, No. 17, pp. 5372-5373.
Lee et al., "Preparation of Microporous Carbon Nanospheres," Carbon, 2003, vol. 41, No. 8, pp. 1652-1654.
Kulisch et al., "Deposition, Characterization and Application of Nitrogen-Rich Amorphous Carbon Nitride Films," New Diamond and Frontier Carbon Tech., 2001, vol. 11, No. 1, pp. 53-76.
Cui et al., "A Review of Investigations on Biocompatibility of Diamond-like Carbon and Carbon Nitride Films," Sep. 2000, vol. 131, No. 1-3, pp. 481-487.

(Continued)

Primary Examiner—Melvin C Mayes
Assistant Examiner—Guinever S Gregorio
(74) Attorney, Agent, or Firm—Samuel L. Borkowsky (57) ABSTRACT

The high-nitrogen compound 3,6-di(azido)-1,2,4,5-tetrazine (DiAT) was synthesized by a relatively simple method and used as a precursor for the preparation of carbon nanospheres and nanopolygons, and nitrogen-rich carbon nitrides.

10 Claims, 5 Drawing Sheets

OTHER PUBLICATIONS

Widlow et al, "Recent Progress in the Synthesis and Characterization of Amorphous and Crystalline Carbon Nitride Coatings," Brazilian J. Phys., Sep. 2000, vol. 30, No. 3, pp. 490-498.

Gillan, "Synthesis of Nitrogen-Rich Carbon Nitride Networks from an Energetic Molecular Azide Precursor," Chem. Mater, Dec. 2000, vol. 12, pp. 3906-3912.

Paine et al., "Synthesis, Characterization, and Explosive Properties of the Nitrogen-Rich Borazine[$H_3N_3B_3(N_3)_3$]," Inorg. Chem., Aug. 1999, vol. 38, pp. 3738-3743.

Chavez et al., "Synthesis of the Bi-Heterocyclic Parent Ring System 1,2,4-Triazola[4,3-*b*][1,2,4,5]Tetrazine and Some 3,6-Disubstituted Derivatives," J. Heterocyclic Chem., Nov.-Dec. 1998, vol. 35, pp. 1329-1332.

Kawaguchi, "B/C/N Materials Based on the Graphite Network," Adv. Mater., Jun. 1997, vol. 9, No. 8, pp. 615-625.

Kang et al., "On Accretion of Nanosize Carbon Spheres," J. Phys. Chem., Mar. 1996, vol. 100, No. 13, pp. 5163-5165.

Coburn et al., "An Improved Synthesis of 3,6-Diamino-1,2,4,5-tetrazine. II. From Triaminoguanidine and 2,4-Pentanedione," J. Heterocyclic Chem., Dec. 1991, vol. 28, pp. 2049-2050.

Honda, "Mesophase Pitch and Meso-Carbon Microbeads," Molecular Cryst. and Liquid Cryst. 1983, vol. 94, No. 1-2, pp. 97-108.

Inagaki et al., "Texture and Graphitization Behavior of Fluid Coke," Carbon, Dec. 1974, vol. 12, No. 6, pp. 639-643.

Yamada et al., "Characteristics of Meso-Carbon Microbeads Separated From Pitch," Carbon, Jun. 1974, vol. 12, No. 3, pp. 307-319.

Marcus et al., "The Reaction of Hydrazine with 3,6-Diamino-*s*-tetrazine," Chem. Products Div., Sep. 1963, vol. 28, pp. 2372-2375.

\* cited by examiner

PREPARATION OF CARBON NANOPARTICLES AND CARBON NITRIDE FROM HIGH NITROGEN COMPOUND

RELATED APPLICATIONS

This application claims the benefit of U.S. Provisional Patent Application Ser. No. 60/622,260 filed Oct. 25, 2004, hereby incorporated by reference.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to high nitrogen materials and, more particularly, to the preparation of carbon nanospheres, carbon nanopolygons, and nitrogen rich carbon nitrides from the high nitrogen compound 3,6-di(azido)-1,2,4,5-tetrazine (DiAT).

BACKGROUND OF THE INVENTION

Micro-bead and nanophase carbon materials have applications in high-density and high-strength carbon artifacts, super active carbon beads of high surface area, lithium storage, lithium battery anodes, packing materials for high performance liquid chromatography, hydrogen storage applications, and catalysis. Much attention has been focused on the preparation and properties of these materials because their applications depend on the shape and size of the particles.

Carbon nitrides are extremely materials. They have low density, are extremely wear resistant, and are generally chemically inert. Carbon nitrides are used in biocompatible coatings on biomedical implants, battery electrodes, catalytic supports, gas separation systems, electronic materials, humidity and gas sensors, and other applications. Applications of carbon nitrides are governed not only by the texture and size of the particles but also by the relative nitrogen content. As a consequence, an extensive effort has been focused on carbon nitride precursors and on methods to increase the nitrogen content of carbon nitrides.

Publications related to the preparation of carbon nanospheres and nitrogen-rich carbon nitrides (i.e. carbon nitrides where the weight percent of nitrogen is greater than about 60 percent) are scarce. Gillan et al., for example, reported the preparation of carbon nitrides $C_3N_4$ (60.9 wt % N) and $C_3N_5$ (66.0 wt % N) and graphitic carbon using high-nitrogen precursor 2,4,6-triazido-1,3,5-triazine (see: Gillan, Chem. Mater., vol. 12, (2000) pp. 3906-3912, incorporated by reference). Also, Lee et al. recently reported a preparation of an aggregate interlinked network of carbon nanospheres from naphthalene-derived isotropic pitch using a lengthy five-step process of acidification, extraction, stabilization, oxidation, and carbonization (see: Lee et al., Carbon, vol. 41, (2003) pp. 1652-1654, incorporated by reference). Through mild grinding, carbon nanospheres having dimensions ranging from about 100 to about 300 nm were individually separated.

There remains a need for better methods for preparing carbon nitrides and precursors for carbon nitrides.

SUMMARY OF THE INVENTION

In accordance with the purposes of the present invention, as embodied and broadly described herein, the present invention includes a method for preparing carbon nanoparticles and carbon nitrides. These materials are prepared using a common precursor, 3,6-di(azido)-1,2,4,5-tetrazine (DiAT). Carbon nanomaterials are prepared by heating 3,6-di(azido)-1,2,4,5-tetrazine to a temperature of about 150 degrees Celsius for sufficient time to form said carbon nanoparticles. Carbon nitrides are prepared by heating 3,6-di(azido)-1,2,4,5-tetrazine to a temperature of about 100 degrees Celsius over a first period, maintaining that temperature for a second period, then increasing the temperature to about 150 degrees Celsius over a third period, and maintaining the temperature at about 150 degrees Celsius for a fourth period.

The invention also includes a method for preparing 3,6-di(azido)-1,2,4,5-tetrazine. The method involves reacting 3,6-bis(3,5-dimethylpyrazol-1-yl)-1,2,4,5-tetrazine with $NH_2NH_2.H_2O$ to form 3,6-di(hydrazino)-1,2,4,5-tetrazine (DHT), then reacting the 3,6-di(hydrazino)-1,2,4,5-tetrazine with an aqueous hydrochloric acid solution of $NaNO_2$, thereby forming a crude reaction product comprising 3,6-di(azido)-1,2,4,5-tetrazine and solid impurities, and extracting the 3,6-di(azido)-1,2,4,5-tetrazine away from the impurities in the crude reaction product.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION

This invention is concerned with the preparation of carbon nanospheres, nanopolygons, and the nitrogen-rich carbon nitrides $C_3N_4$ and $C_3N_5$ from the known high nitrogen compound 3,6-di(azido)-1,2,4,5-tetrazine (DiAT) to prepare The invention also includes an improved synthesis of DiAT.

An advantage of the present invention is related to the mild conditions used for converting DiAT to nitrogen rich carbon nitrides and carbon nanoparticles. Another advantage is that the conversion of DiAT to nitrogen-rich carbon nitrides generates no environmental waste or pollution.

Figure 1A:
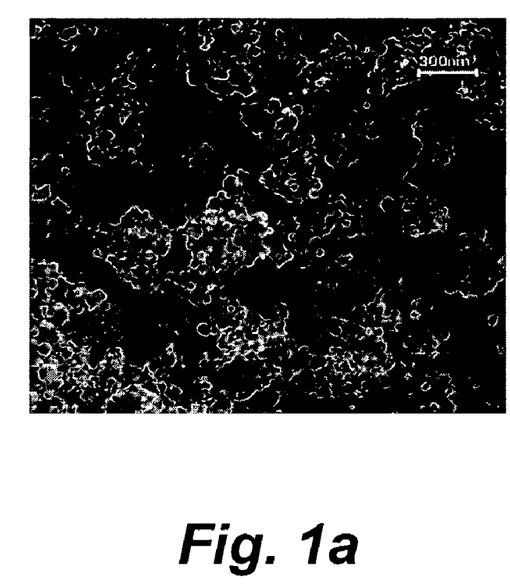
FIG. 1a and FIG. 1b show scanning electronic microscopy (SEM) images of carbon nanospheres prepared from DiAT according to this invention.
Figure 1B:
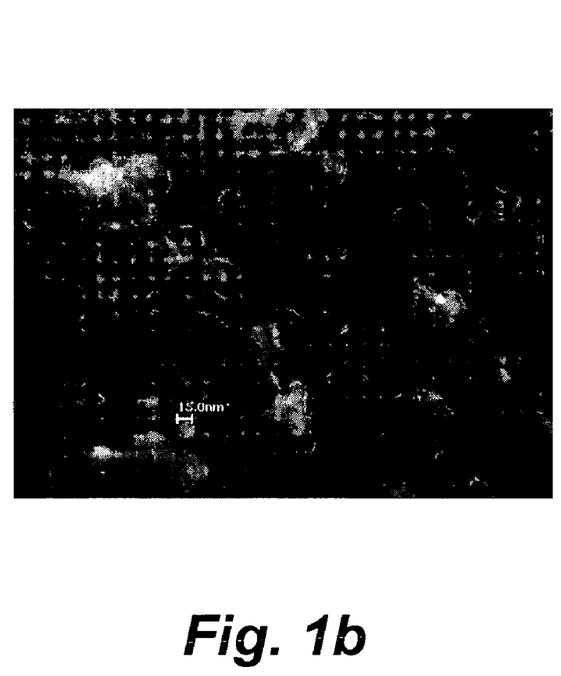

Carbon nanoparticles were prepared using DiAT precursor in an air atmosphere. Two different rates of heating were employed. In an exemplary preparation, a sample of DiAT (0.2 g) was loaded into a 50 ml stainless steel bomb and heated to a temperature of about 150 degrees Celsius over a two-hour period. The scanning electron micrograph (SEM)

images of the product that are shown in FIG. 1a and FIG. 1b demonstrate that the product includes spherical nanoparticles.

Figure 2A:
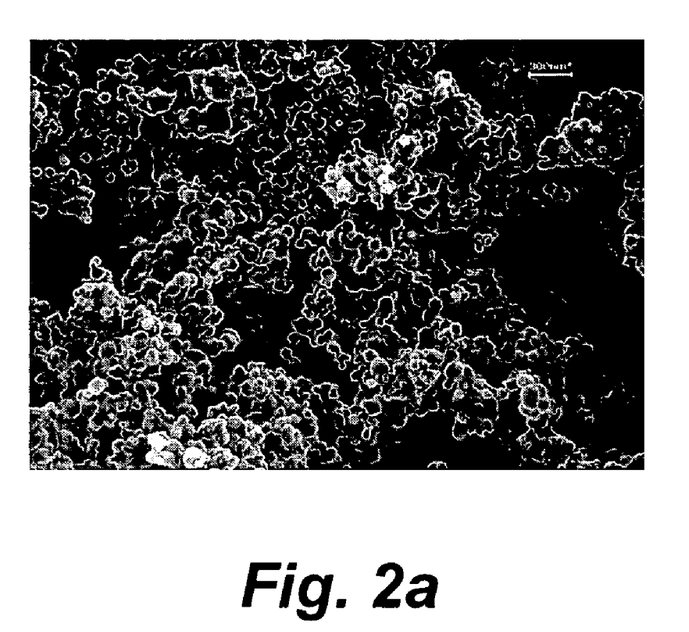
FIG. 2a and FIG. 2b show SEM images of irregular carbon nanopolygons prepared from 3,6-di(azido)-1,2,4,5-tetrazine (DiAT) according to this invention.
Figure 2B:
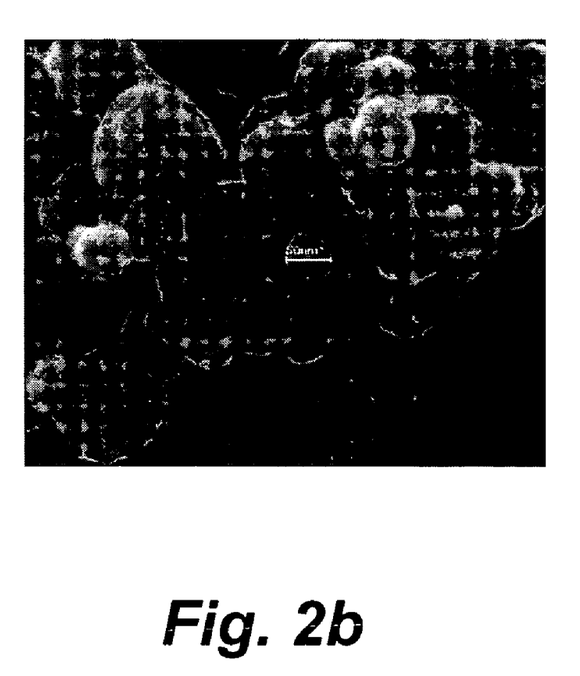

In another exemplary preparation, DiAT was heated to 150 degrees Celsius over only one hour. During this hour, an audible pop occurred. The SEM images of the product recovered from the bomb that shown in FIGS. 2a and 2b indicate that the product particles formed in this preparation are: (1) about twice the size of the previously described spherical nanospheres, and (2) have irregular polygonal shapes. Analyses of the carbon nanopolygons using gas pycnometry, infrared spectroscopic data, and elemental analysis indicate that the carbon nanopolygons are similar in composition to the carbon nanospheres.

Figure 3A:
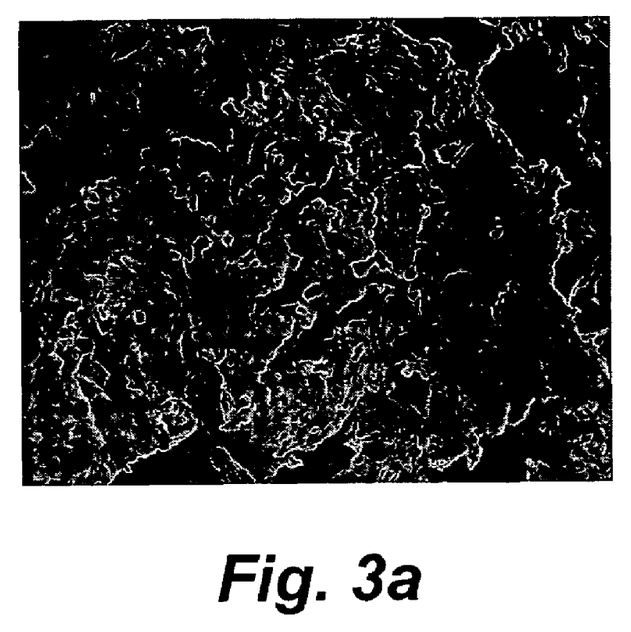
FIG. 3a and FIG. 3b shows SEM images of the carbon nitride $C_3N_4$ prepared from DiAT. The $C_3N_4$ of FIG. 3a is shaped like a leaf, while the $C_3N_4$ of FIG. 3b is spherical and rope shaped.

DiAT was also used to prepare carbon nitrides. Brown-colored nitrogen-rich carbon nitrides were prepared under an air atmosphere using a variety of heating procedures. One procedure involves placing a fluffy sample of DiAT (0.3 g) into a stainless steel bomb, heating the sample to a temperature of about 100 degrees Celsius over about two hours, holding the temperature constant for an additional two hours, then increasing the temperature to about 150 degrees Celsius over about a three-hour period and maintaining the temperature overnight. Analyses of the product demonstrate that the chemical composition of the product is the carbon nitride $C_3N_4$. An SEM (see FIG. 3a) indicates that the product has a leaf shape.

In another procedure, DiAT was heated continuously to a temperature of about 150 degrees Celsius over a five-hour period. The temperature was held constant overnight. An SEM image of the product (see FIG. 3b) indicates that the product has a rope and ball-like shape. Additional analyses demonstrate that the chemical composition of the product is also $C_3N_4$.

Other procedures involved using consolidated powder instead of loose powder. In one procedure, a consolidated sample of DiAT (0.3 grams) was heated to a temperature of about 150 degrees Celsius under a nitrogen atmosphere. Analyses demonstrated that the product formed was a different carbon nitride, C3N5. The SEM (see FIG. 4a) showed the presence of solid, sheet-like particles. In another procedure, rope/ball-like carbon nitride $C_3N_5$ was obtained (see FIG. 4b).

DiAT is an ideal precursor because of its clean and thermodynamically favorable decomposition to form nitrogen-rich carbon nitrides. It is believed that upon decomposition, DiAT extrudes nitrogen gas as the only by-product. The thermal decomposition of DiAT to form $C_3N_4$, and $C_3N_5$, is illustrated in equation 1 and equation 2, respectively, below.

(1) $3 C_2N_{10} \xrightarrow{\Delta} 2 C_3N_4 + 11 N_2$ (2) $3 C_2N_{10} \xrightarrow{\Delta} 2 C_3N_5 + 10 N_2$ The present invention is also concerned with an improved synthesis of DiAT. The present synthesis is an improvement over a synthesis reported in 1963 (see: Marcus et al., Journal of Organic Chemistry, vol. 28 (1963) pp. 2372-2375, incorporated by reference herein). The earlier reported synthesis included a first step of converting 3,6-diamino-1,2,4,5-tetrazine to 3,6-di(hydrazino)-1,2,4,5-tetrazine (DHT=2). This step is inefficient and costly because anhydrous hydrazine is the solvent for this step.

The improved synthesis of DiAT according to the present invention is illustrated in SCHEME 1 below.

SCHEME 1.

The invention employs the readily available compound 3,6-bis(3,5-dimethylpyrazol-1-yl)-1,2,4,5-tetrazine (1) (see: M. D. Coburn et al., Journal of Heterocyclic Chemistry, vol. 28 (1991) pp. 2049-2050, incorporated by reference herein). Compound (1) undergoes a rapid reaction with hydrazine hydrate to yield DHT (2) (see: D. E. Chavez et al., Journal of Heterocyclic Chemistry, vol. 35 (1998) pp. 1329-1332, incorporated by reference herein). Compound (2) is diazotized in 3 M HCl solution at 0 degrees Celsius to yield DiAT. The entire synthesis is performed under in the air at atmospheric pressure without vacuum systems, extraction, carbonization, or any additional purification steps.

The present invention is more particularly described in the following EXAMPLES that are intended as illustrative only, since numerous modifications and variations will be apparent to those skilled in the art.

EXAMPLES 1 and 2

Preparation of carbon nanospheres and irregularly shaped nanopolygons from DiAT. 3,6-di(azido)-1,2,4,5-tetrazine (DiAT) (0.2 g) was loaded into a 50 ml stainless steel bomb and heated to a temperature of about 150 degrees Celsius over a two-hour period. The solid product collected from the bomb was analyzed using gas pycnometry, infrared spectroscopic data, and elemental analysis. From these procedures, it was concluded that the product was composed of carbon. Scanning electron microscope (SEM) images of the product are shown in FIG. 1a and FIG. 1b. The image indicates that the product includes spherical shaped particles.

Another sample of DiAT was loaded into a 50 ML stainless steel bomb and heated to a temperature of about 150 degrees over a one-hour period. During this period, an audible pop occurred. Heating was discontinued. The solid product recovered from the bomb was also analyzed using gas pycnometry, infrared spectroscopic data, and elemental analysis. These procedures indicate that the solid product was similar in composition to the spherical carbon nanospheres. SEM images of the product shown in FIGS. 2a and 2b indicates that the product particles are nanoparticles with polygonal shapes.

Characterization for nanospheres and nanopolygons: Infrared (cm$^{-1}$, Nujol mull): 1112 (vs) and 475 (vs). Elemental analysis, found: C, 98.06; H, 0.00; N, 0.34; O 0.26. Gas pycnometry: $\rho=1.35\pm0.05$ g cm$^{-3}$).

EXAMPLES 3 and 4

Preparation of carbon nitride $C_3N_4$ from DiAT. In the presence of air, nitrogen-rich carbon nitrides are prepared using two different heating protocols. A 0.3 g fluffy sample of DiAT was heated in a 50 ml stainless steel bomb. The temperature rose to about 100 degrees Celsius for over a two-hour period and was held constant for an additional four hours. The temperature was then increased to 150 degrees Celsius over a three-hour period and maintained at this temperature overnight to yield the brown, leaf-like carbon nitride $C_3N_4$ shown in FIG. 3a.

Figure 3B:
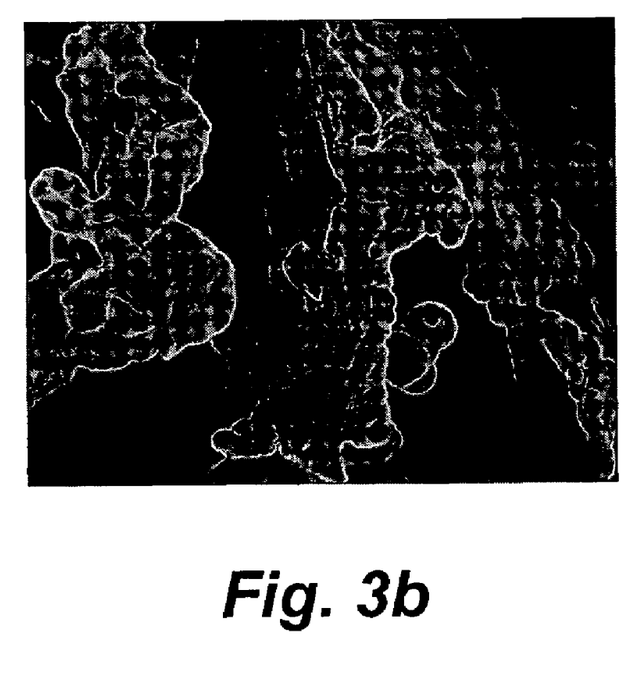

When DiAT was heated continuously to a temperature of about 150 degrees Celsius over a five-hour period and then held at that temperature overnight, the rope/ball-like carbon nitride $C_3N_4$ was observed, as shown in FIG. 3b. Both carbon nitride products were characterized by infrared spectroscopy, elemental analysis, Thermal Gravimetric Analysis (TGA), and gas pycnometry and analyzed by SEM imaging.

Characterization for leaf-like and rope/ball-like carbon nitride $C_3N_4$: Infrared (cm$^{-1}$, Nujol mull): 1088 (vs), 974 (s), 890 (s), 811 (s), 775 (vs), and 467 (vs). Elemental analysis, found: C, 38.76; H, 1.68; N, 59.52. TGA: robust up to ~650° C. Gas pycnometry: $\rho=0.58\pm0.02$ g cm$^{-3}$ for the leaf-like and $1.03\pm0.03$ g cm$^{-3}$ for the rope/ball-like.

EXAMPLES 5 and 6

Figure 4A:
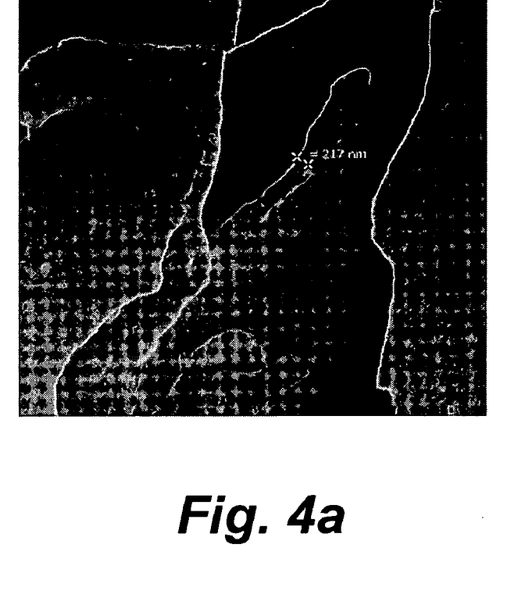
FIG. 4a and FIG. 4b SEM images of carbon nitride $C_3N_5$ prepared from DiAT. The $C_3N_5$ of FIG. 4a is shaped like plates, while that for FIG. 4b is spherical and rope shaped.
Figure 4B:
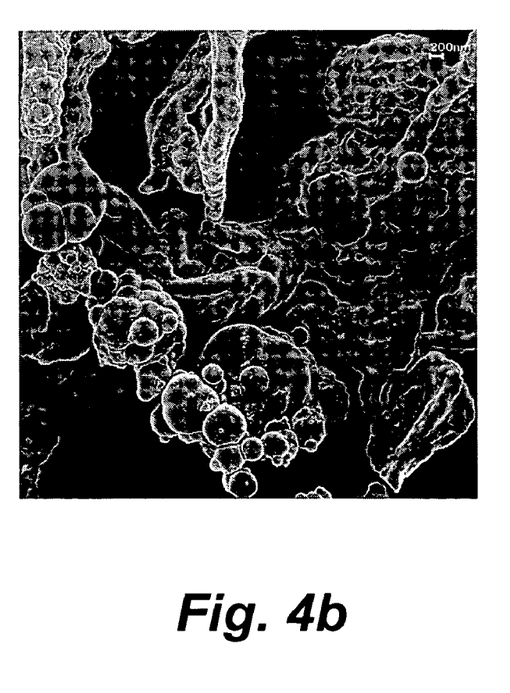

Preparation of carbon nitride $C_3N_5$ from DiAT. Under a nitrogen atmosphere, a 0.3 g consolidated sample of DiAT was heated in a 50 ml stainless steel bomb. The temperature rose to about 100 degrees Celsius for over a two-hour period and was held constant for an additional four hours. The temperature was then increased to 150 degrees Celsius over a three-hour period and maintained at this temperature overnight. The product was sheet-like carbon nitride $C_3N_5$, an image of which is shown in FIG. 4a.

Under a nitrogen atmosphere, a 0.3 g sample of consolidated DiAT was heated in a 50 ml stainless steel bomb to a temperature of about 150 degrees Celsius over a five-hour period and then held at that temperature overnight. The product recovered from the bomb was $C_3N_5$ and had the rope/ball-like shape shown in FIG. 4b.

Characterization for plate-like and rope/ball-like carbon nitride $C_3N_5$: Infrared (cm$^{-1}$, Nujol mull): 1261 (vs), 1099 (vs), 1027 (s), 890 (s), 801 (s), 778 (vs), and 482 (vs); Found elemental analysis: C, 35.60; H, 1.86; N, 66.31. TGA: robust up to ~650° C.; Gas pycnometry: $\rho=1.32\pm0.02$ g cm$^{-3}$ for the sheet-like and $1.23$ g$\pm0.02$ cm$^{-3}$ for the rope/ball-like.

EXAMPLE 7

Synthesis of 3,6-di(hydrazino)-1,2,4,5-tetrazine (DHT). 3,6-di(hydrazino)-1,2,4,5-tetrazine (DHT) was prepared by reacting 3,6-bis(3,5-dimethylpyrazol-1-yl)-1,2,4,5-tetrazine with $NH_2NH_2.H_2O$ in acetonitrile according to the procedure by D. E. Chavez et al. in Journal of Heterocyclic Chemistry, vol. 35 (1998) pp. 1329-1332, incorporated by reference herein.

EXAMPLE 8

Synthesis of DiAT from DHT. To a 100 ml-jacketed beaker containing 40 ml of 3 M HCl was added 0.5 g (3.52 mmol) of DHT. The resulting suspension was stirred to dissolve all the solids, and the temperature of the resulting solution was adjusted to minus 5 degrees Celsius and stirred vigorously while 10 ml solution of $NaNO_2$ (0.61 g, 8.84 mmol) was added drop wise while maintaining the temperature below 3 degrees Celsius. The reaction was allowed to proceed at a temperature of about 0 degrees Celsius for 30 minutes during which a bright orange solid precipitated. The precipitate was filtered, washed thoroughly with cold water, and air-dried. This crude product was dissolved in methylene chloride to remove an insoluble impurity. The filtrate was slowly evaporated to give 3,6-di(azido)-1,2,4,5-tetrazine (DiAT) as a crystalline product in a 54% yield.

The DiAT that was used to prepare nanospheres, nanopolygons, and carbon nitride was prepared according to the above procedure with a slight modification. After filtering the DiAT, it was mounted for drying above the stainless steel bomb in the hood behind a blast shield overnight, then washed into the bomb using $CH_2Cl_2$, which was gradually evaporated. The bomb was sealed before the assembled apparatus was moved.

Characterization for DiAT: a) Differential Scanning Calorimetry (DSC): fast decomposition at 130° C.; b) Cyclic voltammetry in 0.2 M $Bu_4NPF_6$/$CHCl_3$ (V vs SSCE): $E_{1/2}=+0.44$ and $-0.09$ V; c) Infrared (cm$^{-1}$, Nujol mull): $\nu$ ($N_3$) 2169 (vs) and 2142 (vs); $\nu$ (tetrazine) 1460 (vs), 1193 (vs), 1065 (vs), 927 (vs), 817 (vs) and 546 (vs); d) UV-Visible spectra in $CHCl_3$ ($\lambda_{max}$, nm ($\epsilon$, M$^{-1}$ cm$^{-1}$): 541 sh (4.64×10$^2$), 521 (6.50×10$^2$), 373 (1.79×10$^3$), and 268 (1.94×10$^4$); and e) $^{13}$C NMR (300 MHz, $CDCl_3$, 25° C.): 164.2.

Figure 5:
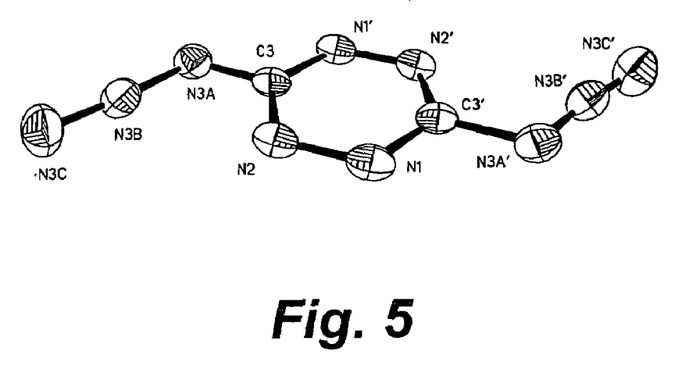
FIG. 5 shows an ORTEP diagram of DiAT.

The DiAT was isolated and characterized by differential scanning calorimetry (DSC), cyclic voltammetry, and infrared, UV-Visible, $^{13}$C NMR spectroscopy, and X-ray crystallography. X-ray quality crystals of DiAT were grown by slow evaporation of a DiAT containing solution (4:1 (v/v) benzene: octane) and used to obtain the crystal structure of DiAT. FIG. 5 shows an ORTEP diagram (25 percent ellipsoids) and labeling scheme for DiAT. Selective bond distances (Å) and angles (°) for DiAT are as follows: a) N1–N2=1.310(3), N2–C3=1.328(3), and C3–N3A=1.376(4); b) N2–C3–N3A=119.9(2), N1'–C3–N3A=113.9(2), and N1'–C3–N2=126.2(3).

Figure 6:
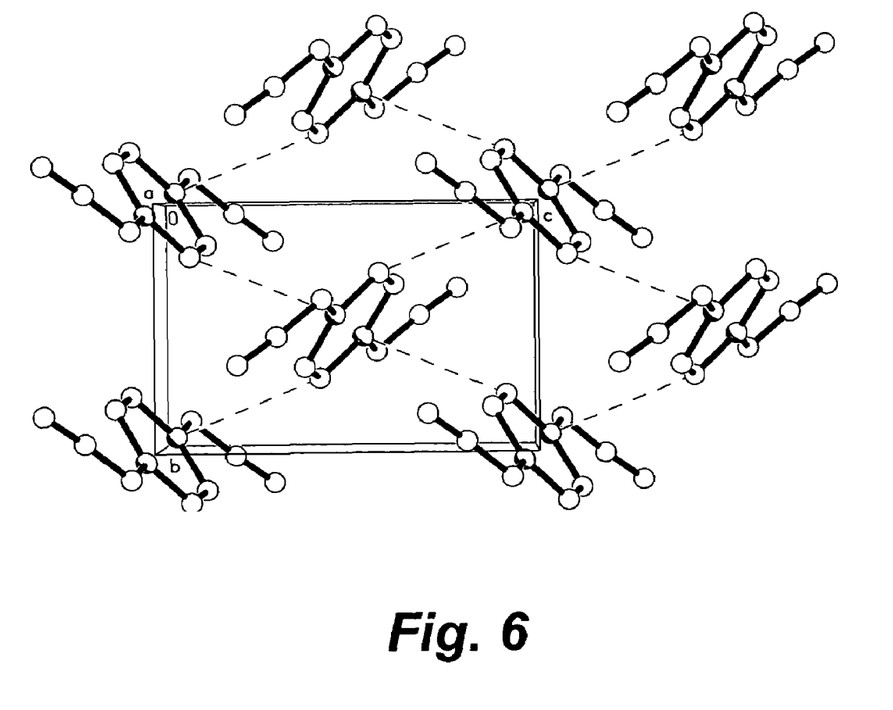
FIG. 6 shows a diagram of how DiAT molecules are packed.

The X-ray analysis shows that molecules of DiAT are densely packed (d=1.72 g/cm$^3$). FIG. 6 shows details of the packing. The pattern shown is of planar molecules adopting two different alternating inclinations, which is a familiar pattern that is commonly referred to as a herringbone pattern, and is frequently seen in crystals of non-hydrogen-bonded planar molecules such as naphthalene. In DiAT, the dihedral angle between the ring planes of neighboring molecules of differing tilt is 72.1°. The closest intermolecular approach seen in the crystal is shown as a dashed line (repeated by symmetry operations) between nearest neighbors. It is a ring C to ring N approach of 3.037 Å, which is slightly shorter than the corresponding van der Waals contact distance of 3.25 Å. Parallel molecules, such as the neighbors occurring vertically or horizontally, have no close contacts. Each azido group is in close contact with four neighboring azido groups, displaying six approach distances of 3.13-3.15 Å, just slightly beyond the N . . . N van der Waals contact distance of 3.10 Å.

DiAT is extremely sensitive to friction, impact, and electrostatic discharge, and therefore, for safety reasons, should be handled wet with thick gloves behind a glass shield, and in small amounts (preferably less than 300 mg). For an explanation of methods for characterizing explosive sensitivity, see, for example, R. T. Paine et al., Inorganic Chemistry, vol. 38 (1999) pp. 3738-3743, incorporated by reference).

In summary, this invention is concerned a simple preparation of DiAT and with the preparation of carbon nitride and carbon nanospheres (5 to 50 nm in diameter) and nanopolygons from DiAT. DiAT undergoes thermal decomposition to give carbon nanospheres (5 to 50 nm in diameter) and several morphologies of nitrogen-rich carbon nitrides. The textures, size, and the nitrogen content of carbon nitrides depend on the heating pattern, and thus can be tailored for particular applications.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing carbon nitride comprising heating 3,6-di(azido)-1,2,4,5-tetrazine to a temperature of about 100 degrees Celsius over a first period, maintaining that temperature for a second period, then increasing the temperature to about 150 degrees Celsius over a third period, and maintaining the temperature at about 150 degrees Celsius for a fourth period.

2. The method of claim 1, wherein the first period is about two hours.

3. The method of claim 1, wherein the second period is about 4 hours.

4. The method of claim 1, wherein the third period is from about 3 hours to about 5 hours.

5. The method of claim 1, wherein the fourth period is at least an hour.

6. The method of claim 1, wherein the 3,6-di(azido)-1,2,4,5-tetrazine is heated under an air atmosphere.

7. The method of claim 1, wherein the 3,6-di(azido)-1,2,4,5-tetrazine is heated under an inert atmosphere.

8. The method of claim 1, wherein the 3,6-di(azido)-1,2,4,5-tetrazine is heated under an atmosphere of substantially nitrogen.

9. The method of claim 1, wherein the carbon nitride comprises the formula $C_3N_4$.

10. The method of claim 1, wherein the carbon nitride comprises the formula $C_3N_5$.

* * * * *